Patented Aug. 26, 1952

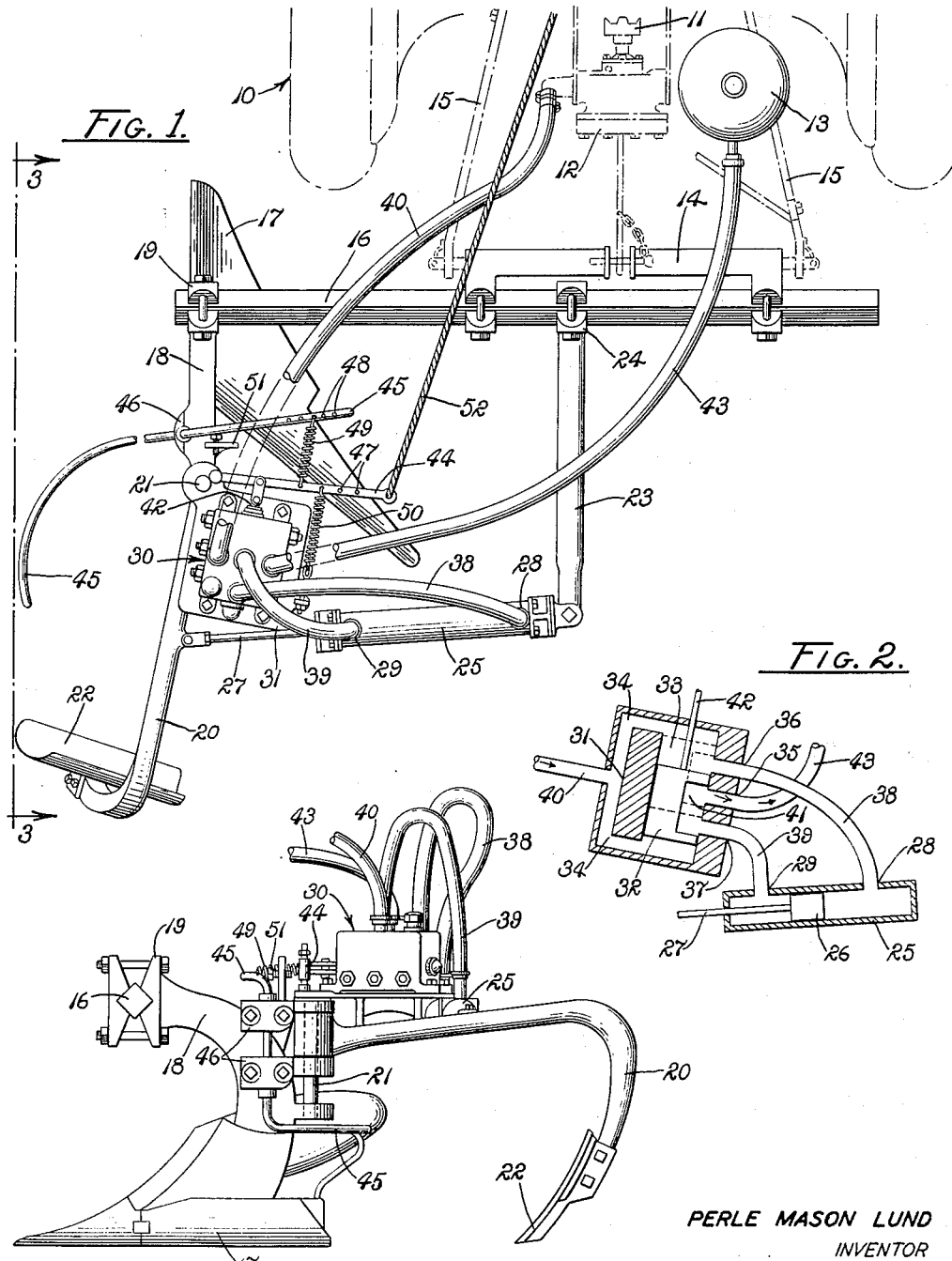

2,608,146

UNITED STATES PATENT OFFICE 2,608,146

AUTOMATIC TRACTOR MOUNTED VINEYARD PLOW

Perle Mason Lund, Woodlake, Calif.

Application February 10, 1947, Serial No. 727,559

4 Claims. (Cl. 97—137)

The present invention relates to row-crop cultivators and more particularly to automatic vineyard hoes directed to the working of the earth close to the vines.

A tedious and costly procedure in the production of row crops is the cultivation of the soil in the rows. This procedure is periodically required to destroy weeds and to remove insect harboring debris. When it is borne in mind that the weeds and debris missed by the cultivator are generally required to be removed by hand labor, a concept of the tedious and exacting cultivating requirements is had. The problems incident to such cultivation are generally encountered in their most aggravated form in vineyards and other row-crops in which it is impossible to give the soil at least a seasonal, over-all cultivation. Further, vineyards are usually found in areas in which the soil and climate are conducive to the rapid growth of tenacious weeds.

Conventional vineyard cultivating practices comprise cultivating between the rows of vines as widely as is readily accomplished and subsequently thereto, cultivating the soil immediately adjacent the vines and between the vines in the rows by manually guided or automatic earth working tools. The present invention relates generally to the latter group, but is readily distinguished from the automatic devices heretofore known.

An object of the present invention is to cultivate the soil linearly along row crops, between spaced plants in the rows and laterally offset to pass around each plant in an accurate, dependable and expeditious manner.

Another object is to provide an improved agricultural implement adapted automatically to guide itself, in response to row crops encountered in the rows, so as to cultivate the earth in the rows between and adjacent said crops.

Another object is to provide an earth working tool automatically positioned laterally, relative to the direction in which it is drawn, in response to obstructions encountered by a guide.

Another object is to provide a laterally, hydraulically reciprocated, vineyard cultivator, dependable in operation, rugged in construction, effective in the removal of weeds and debris from the soil adjacent the vines, and safe to employ in young as well as old vines.

Further objects are to provide improved elements and arrangements thereof in a device of the character and for purposes set forth.

In the drawing:

Fig. 1 is a plan view of the device of the present invention in operational relation to the rear of a tractor by which it is motivated.

Fig. 2 is a schematic diagram of a portion of the hydraulic system of the present invention.

Fig. 3 is a side elevation of the vineyard cultivator embodying the principles of the present invention.

Referring in greater detail to the drawing:

The numeral 10 designates generally a drawing vehicle such as a tractor to which the device of the present invention is removably attached. The tractor has a power take-off 11 by which a hydraulic pump 12 is driven. A reservoir 13 for the hydraulic fluid is maintained in fluid communication with the intake side of the pump. Rearwardly disposed the tractor is a conventional A frame 14 borne by braces 15 and in turn mounting and elevationally positioning a tool bar 16 transversely to the normal direction of movement of the tractor. These elements are of conventional form and exemplify a vehicle and mounting by which the present invention may be supported and motivated. It is to be understood that the present invention is not limited to such a vehicle, but may be mounted on any suitable vehicle providing the requisite hydraulic means and traction. A plow 17 is disposed at the end of a beam 18 the opposite end of which beam is rigidly connected to the tool bar 16 through the medium of a clamp 19. The plow is adapted to be drawn a spaced distance from a row of vines to provide a furrow into which an earth working tool, presently more fully described, may discharge soil, weeds, and debris encountered.

A pivotal beam 20 is connected at its forward end to the rearward end of the fixed beam 18 by pivot means 21 to have a reciprocal travel generally horizontal and lateral to the normal direction of movement of the tractor. An earth working tool 22 is borne in ground engagement by the rearwardly disposed end portion of the pivotal beam. The earth working tool may take various forms, but is generally of a type commonly known in agricultural implements as a French plow in that it is adapted to work the soil and remove weeds and debris from between the vines.

A bracket 23 is fixedly mounted on the tool bar 16 and rearwardly extended therefrom to a position laterally and inwardly disposed from the pivotal beam 20. A clamp 24, similar to the clamp 19, is conveniently employed to mount the bracket and provides adjustable spacing of the fixed beam and the bracket by its longitudinal positioning on the tool bar. A telescopic hydraulic member comprising a cylinder 25, a piston 26 slidably engaged therein, and a connecting rod 27, as seen in Fig. 1 and schematically illustrated in Fig. 2, is pivotally connected to the pivotal beam 20 and the rearward end portion of the bracket 23. The cylinder has ports 28 and 29, respectively, in the opposite end portions thereof whereby the hydraulic pressures may be varied on the opposite sides of the piston to extend or contract the hydraulic member as desired. It will be appreciated that said contraction and extension of the hydraulic member results in reciprocal positioning of the pivotal beam 20.

A hydraulic control valve 30 is fixedly mounted near the forward end portion of the pivotal beam 20. The valve may take several forms, a typical valve suited to the purpose being schematically illustrated in Fig. 2. Said valve comprises a body portion 31 having a valve piston 32 slidably received by a hollow cylindrical valving chamber 33. Hydraulic fluid under pressure is admitted to the valve chamber on each side of the valve piston through intake ports 34. A centrally located exhaust port 35 permits the hydraulic fluid to be discharged from the valve chamber. A pair of control ports 36 and 37 are provided near opposite end portions of the valve chamber. A fluid conduit 38 communicates between the control port 36 and the port 28 of the hydraulic member. A similar conduit 39 communicates between the control port 37 and the port 29 of the hydraulic control member. A further conduit 40 communicates between the high pressure side of the hydraulic pump 12 and the intake port 34 of the hydraulic control valve. The valve piston 32 has a longitudinal passage 41 intermediate its end portions in a side thereof of such a length and so positioned always to register with the exhaust port 35 and the control ports 36 and 37 or either of them according to valve piston positioning. A positioning rod 42 is connected to the valve piston and extends outwardly from the body portion thereof for external control. The operation of the valve is obvious from the diagram of Fig. 2. Hydraulic fluid under pressure is impressed upon the system through the intake ports 34. When the valve piston is positioned, as shown in the diagram, the fluid under pressure passes through the valve chamber 33, out through the control port 36 and is conducted by the conduit 38 to the port 28 in the hydraulic member where it enters the cylinder 25 and forces the piston 26 to the left. As the piston 26 moves to the left, it is necessary to permit the hydraulic fluid in the left end of the cylinder 25 to be bled. This is accomplished by a flow of the hydraulic fluid through the port 29 conduit 39, control port 37, passage 41 in the valve piston 32, exhaust port 35, and subsequently back to the reservoir 13 by means of a conduit 43. It will be obvious, that as the valve piston 32 is moved from the extreme position shown in Fig. 2, the control port 37 will be gradually closed and the control port 36 correspondingly opened until the opposite extreme position is reached wherein the control port 37 is completely closed and the control port 36 entirely opened. This operation provides an accurate means for positioning the piston 26 in the cylinder 25 telescopically extending or contracting the hydraulic control member as desired in response to valve piston positioning. It is apparent in Fig. 2 that when the piston 32 is centrally positioned, the portions of the piston at the ends of the passage 41 will overlay and substantially block the control ports 36 and 37 thus materially restricting or stopping entirely fluid flow through the conduits. Thus, depending upon the particular characteristics of the valve employed, manual or automatic movement of the piston 32 to central position either blocks all fluid movement to and from the cylinder 25 locking the piston 26 in adjusted position or so restricts such fluid movement that the piston can only very slowly depart from adjusted position and while so departing be subjected to immediate correction by manual and/or automatic control.

A lever 44 is pivotally mounted inwardly disposed the pivotal beam 20 and linked to the positioning rod 42 of the hydraulic control valve. A control arm 45, having a rearwardly curved outer end portion and an extended inner end portion, is pivotally mounted on the fixed or rigid beam 18 as shown at 46 in Figs. 1 and 3 generally transversely thereto. The outer end portion of the control arm is preferably extended from the fixed beam at approximately the height of the upper portion of the earth working tool 22 so that it may engage obstructions that normally would snag the tool. The lever 44 has a series of connecting openings 47 formed in the inwardly disposed end portion thereof and the control arm 45 has a similar series of openings 48 formed in its inwardly disposed end portion. A helical tension spring 49 links the control arm 45 and the lever 44 by being engaged in an opening 47 of the lever and an opening 48 of the control arm. The plurality of available connecting points provides a means whereby the relative mechanical advantages of the lever and the control arm may be adjusted as desired. A second tension spring 50 is connected to the lever 44 and to the body portion 31 of the hydraulic control valve to urge said lever into retracted position. An adjustable stop 51 is mounted on the fixed beam 18 to limit the forward movement of the outer end portion of the control arm from a substantially lateral position, and through the spring 49 to restrict the retraction of the lever 44 by the spring 50. To permit manual motivation of the valve to retract the earth working tool in emergencies, a flexible tension member 52 is connected to the lever 44 and run forward to a conveniently accessible position on the tractor.

*Operation*

The operation of the cultivator of the present invention is believed to be obvious from the foregoing description and is briefly summarized as follows:

The spring 49, the retraction spring 50 and the stop 51 are adjusted as described so that the control arm 45 is laterally extended from the cultivator and the earth working tool 22 extended outwardly beyond the furrow of the plow 17 a sufficient distance to engage the soil between the vines. It is apparent that the further the positioning rod 42 is inserted into the valve body 31 the greater will be the hydraulic pressure impressed on the hydraulic control member through the port 28 in relation to that impressed through the port 29 and the greater will be the extension of the telescopic hydraulic control member. Thus, the lateral extension of the earth working tool 22 is greatest when the retraction spring 50 is connected to exert a maximum of force on the lever urging the positioning rod inwardly. Substantially the same effect may be accomplished by positioning the spring 49 so that the mechanical advantage of the control arm 45 relative to the lever 44 is decreased.

The cultivator is drawn along the side of a row of vines, the plow 17 providing a furrow substantially parallel and as near to the row as may safely be accomplished. The earth working tool 22 engages the soil between the vines of the row and discharges weeds, debris, and soil which is encountered, into the furrow of the plow. When the control arm 45 encounters an obstruction in the row, such as a vine, the control arm is pivoted in a counterclockwise direction, as seen in Fig. 1, drawing forward on the lever 44 by means of the spring 49 and withdrawing the positioning rod 42 from the valve 30 resulting in retraction of the earth working tool 22 from between the vines of the row. As soon as the control arm 45 has passed the obstruction the springs 49 and 50 return said control arm to its lateral position and the lever 44 to its normal operating position, resulting in the return of the earth working tool 22 to its predetermined operational position.

The cultivator of the present invention works the soil contiguous row crops in an accurate, dependable, and expeditious manner as it is guided in response to the vines encountered in the rows. The hydraulic reciprocation of the pivotal beam 20 and the earth working tool borne thereby is dependable in operation, being activated by even the younger and smaller vines encountered in a vineyard.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices and systems.

Having described my invention, what I claim is new and desire to secure by Letters Patent is:

1. In a cultivator adapted for attachment to a drawing vehicle comprising a beam rigidly attached at its forward end to such a vehicle, a second beam connected at its forward end to the rearward end of the rigid beam for lateral pivotal movement, an earth-working tool borne by the free end portion of the pivotal beam, a bracket member rigidly attached at its forward end to the vehicle and having its opposite end laterally and inwardly disposed to the pivotal beam, the combination of a two-way hydraulic ram connected between the pivotal beam and the bracket member, a valve borne by the pivotal beam and having controlling connection to the ram and regulating pressure supply to opposite ends thereof, a control arm pivotally mounted on the rigid beam and laterally extended therefrom, resilient means urging the control arm into lateral position, and communicating means between the control arm and the valve translating relative movements of the control arm and pivotal beam, on which the valve is mounted, into operation of the valve.

2. In an automatic hoe, adapted for use with a draft appliance, comprising a forwardly movable supporting structure connected to a draft appliance, a beam pivotally connected to the supporting structure and rearwardly extended therefrom for lateral pivotal movement, an earth working tool borne by the beam, a fixed member rearwardly extended from the draft appliance, a two-way hydraulic ram connected between the fixed member and the pivotal beam, the combination of a valve having connection to a source of hydraulic fluid under pressure mounted on the pivotal beam, conduits interconnecting the valve and opposite ends of the two-way ram, a control arm pivotally mounted on the supporting structure and laterally extended therefrom forwardly adjacent to the beam for horizontal pivotal movement in response to obstruction engagement, and a linkage having controlled connection to the arm and controlling connection to the valve and through operation of the valve shortening the ram in response to movement of the control arm and pivotal beam toward each other and extending the ram in response to movement of the control arm and pivotal beam away from each other.

3. In a hydraulically controlled hoe having a forwardly movable support frame, a beam mounted on the frame for substantially horizontal pivotal movement rearwardly extended from the frame, an earth working tool borne by the rearwardly extended end of the beam, and hydraulic means for laterally pivoting the beam; the combination of a valve mounted on the beam in hydraulically controlling relation to the hydraulic means, a control arm pivotally mounted on the frame forwardly of the valve and laterally extended from the frame, and a control linkage interconnecting the control arm and the valve translating pivotal spacing of the control arm and the valve mounted on the beam into continuous regulation of the hydraulic means for responsive control of the beam.

4. In an automatic hoe having a forwardly movable support frame, a beam pivotally connected to the frame for horizontal pivotal movement and rearwardly extended therefrom, and an earth working tool borne by the rearward end portion of the beam; an automatic control comprising a rigid beam rearwardly extended from the frame in spaced relation to the pivoted beam, an extensible and contractable hydraulic ram pivotally connected between the pivotal beam and the rigid beam, a two-way valve having a connection with a source of hydraulic fluid under pressure and each end of the ram mounted on the pivotal beam for movement therewith, said valve having a forwardly disposed operating means adapted to direct hydraulic pressure selectively to either end of the ram while bleeding the opposite end of the ram therethrough, a control arm pivotally mounted on the frame in laterally extended position forwardly of the pivotal beam, and a control linkage interconnecting the operating means of the valve and the control arm, and operating the valve to contract the ram when the control arm and pivoted beam move toward each other and to extend the ram when the control arm and pivoted beam move away from each other from predetermined angular relation.

PERLE MASON LUND.

REFERENCES CITED

The following references are of record in the file of this patent:

UNITED STATES PATENTS

| Number | Name | Date |
| --- | --- | --- |
| 2,253,130 | Lund | Aug. 19, 1941 |
| 2,442,095 | Reed et al. | May 25, 1948 |

FOREIGN PATENTS

| Number | Country | Date |
| --- | --- | --- |
| 801,644 | France | May 23, 1936 |